(12) United States Patent
Martin

(10) Patent No.: US 6,991,735 B2
(45) Date of Patent: Jan. 31, 2006

(54) FREE RADICAL GENERATOR AND METHOD

(75) Inventor: Roy Martin, Downers Grove, IL (US)

(73) Assignee: USFilter Corporation, Warrendale, PA (US)

( * ) Notice: Subject to any disclaimer, the term of this patent is extended or adjusted under 35 U.S.C. 154(b) by 377 days.

(21) Appl. No.: 10/083,284

(22) Filed: Feb. 26, 2002

(65) Prior Publication Data

US 2003/0160004 A1 Aug. 28, 2003

(51) Int. Cl.
C02F 1/32 (2006.01)
C02F 1/72 (2006.01)

(52) U.S. Cl. ............... 210/748; 210/759; 210/763
(58) Field of Classification Search ........... 210/748, 210/758, 759, 760, 763, 192, 198.1, 205, 210/206; 422/24, 186.3; 250/432 R, 435, 250/436

See application file for complete search history.

(56) References Cited

U.S. PATENT DOCUMENTS

| | | |
|---|---|---|
| 2,008,684 A | 7/1935 | Craddock |
| 2,212,260 A | 8/1940 | Brothman |
| 2,249,263 A | 7/1941 | Wheelwright, Jr. |
| 2,268,461 A | 12/1941 | Nichols |
| 2,556,014 A | 6/1951 | Tolman |
| 2,651,582 A | 9/1953 | Courtney |
| 2,686,110 A | 8/1954 | Carver |
| 2,740,696 A | 4/1956 | Longwell |
| 3,252,689 A | 5/1966 | Blomgren, Sr. et al. |
| 3,319,937 A | 5/1967 | Wilson |
| 3,389,970 A | 6/1968 | Scheibel |
| 3,536,646 A | 10/1970 | Hatch et al. |
| 3,559,959 A | 2/1971 | Davis et al. |
| T896,051 I4 | 3/1972 | Hamlin et al. |
| 3,702,298 A | 11/1972 | Zsoldos et al. |

(Continued)

FOREIGN PATENT DOCUMENTS

| | | |
|---|---|---|
| DD | 262 139 A3 | 11/1988 |
| DE | 4 312 417 A1 | 10/1994 |
| EP | 0 257 740 A1 | 3/1988 |
| EP | 0 504 621 A1 | 9/1992 |
| FR | 2672058 A1 | 7/1992 |
| GB | 2281742 A | 3/1995 |
| JP | 11-33542 A * | 2/1999 |
| JP | 11028479 | 2/1999 |
| JP | 11-057752 A | 3/1999 |
| JP | 11-290878 A | 10/1999 |
| LU | 80951 | 2/1979 |
| WO | WO 89/08728 A1 | 9/1989 |
| WO | WO 96/30307 A1 | 10/1996 |
| WO | WO 00/34760 A1 | 6/2000 |
| WO | WO 01/98558 A2 | 12/2001 |

OTHER PUBLICATIONS

Kim, Yong H., "On the Activation of Polymeric Flocculants," AIChE Annual Spring Meeting, Houston, TX, Apr. 2–6, 1989.

(Continued)

Primary Examiner—Frank M. Lawrence
(74) Attorney, Agent, or Firm—Lowrie, Lando & Anastasi, LLP

(57) ABSTRACT

An apparatus for generating free radical species can be used to sanitize water systems. The apparatus generates hydroxyl free radical species using substantially pure water, or using a liquid that is substantially free of oxygen-reactive species, to maximize free radical species generation to sanitize the water system. The free radical species are generated by ultraviolet radiation having a wavelength of less than or equal to 254 nm.

18 Claims, 4 Drawing Sheets

U.S. PATENT DOCUMENTS

| | | |
|---|---|---|
| 3,742,735 A | 7/1973 | Verreyne et al. |
| 3,747,899 A | 7/1973 | Latinen et al. |
| 3,756,570 A | 9/1973 | Bühner |
| 3,794,817 A | 2/1974 | Shinskey |
| 3,852,234 A | 12/1974 | Venema |
| 3,870,631 A | 3/1975 | Fassell et al. |
| 3,965,027 A | 6/1976 | Boffardi et al. |
| 4,016,078 A | 4/1977 | Clark |
| 4,087,360 A | 5/1978 | Faust et al. |
| 4,113,688 A | 9/1978 | Pearson |
| 4,125,574 A | 11/1978 | Kastner et al. |
| 4,146,676 A | 3/1979 | Saeman et al. |
| 4,171,166 A | 10/1979 | Trowbridge et al. |
| 4,217,145 A | 8/1980 | Gaddis |
| 4,218,147 A | 8/1980 | Rosenberger |
| 4,233,265 A | 11/1980 | Gasper |
| 4,234,440 A | 11/1980 | Hirozawa et al. |
| 4,241,016 A | 12/1980 | Hirozawa et al. |
| 4,243,636 A | 1/1981 | Shiraki et al. |
| 4,300,909 A | 11/1981 | Krumhansl |
| 4,433,701 A | 2/1984 | Cox et al. |
| 4,456,512 A * | 6/1984 | Bieler et al. ............ 204/157.65 |
| 4,470,907 A | 9/1984 | Seneza |
| 4,522,502 A | 6/1985 | Brazelton |
| 4,550,011 A | 10/1985 | McCollum |
| 4,575,678 A | 3/1986 | Hladky |
| 4,581,074 A | 4/1986 | Mankina et al. |
| 4,648,043 A | 3/1987 | O'Leary |
| 4,664,528 A | 5/1987 | Rodgers et al. |
| 4,701,055 A | 10/1987 | Anderson |
| 4,719,252 A | 1/1988 | Dutton et al. |
| 4,747,978 A | 5/1988 | Loehr et al. |
| 4,752,740 A | 6/1988 | Steininger |
| 4,913,822 A | 4/1990 | Chen et al. |
| 4,952,376 A * | 8/1990 | Peterson .................. 422/186.3 |
| 4,965,016 A | 10/1990 | Saitoh et al. |
| 4,977,292 A | 12/1990 | Hwa et al. |
| 4,990,260 A * | 2/1991 | Pisani ........................ 210/664 |
| 5,000,866 A | 3/1991 | Woyciesjes |
| 5,004,549 A | 4/1991 | Wood et al. |
| 5,018,871 A | 5/1991 | Brazelton et al. |
| 5,030,334 A | 7/1991 | Hale |
| 5,061,456 A | 10/1991 | Brazelton et al. |
| 5,112,521 A | 5/1992 | Mullins et al. |
| 5,130,033 A | 7/1992 | Thornhill |
| 5,135,968 A | 8/1992 | Brazelton et al. |
| 5,139,627 A | 8/1992 | Eden et al. |
| 5,164,429 A | 11/1992 | Brazelton et al. |
| 5,213,694 A | 5/1993 | Craig |
| 5,230,822 A | 7/1993 | Kamel et al. |
| 5,236,602 A * | 8/1993 | Jackson ..................... 210/748 |
| 5,239,257 A | 8/1993 | Muller et al. |
| 5,256,307 A | 10/1993 | Bachhofer et al. |
| 5,262,963 A | 11/1993 | Stana et al. |
| 5,302,356 A * | 4/1994 | Shadman et al. ........ 422/186.3 |
| 5,306,355 A | 4/1994 | Lagana |
| 5,306,432 A | 4/1994 | Puetz |
| 5,316,031 A | 5/1994 | Brazelton et al. |
| 5,320,748 A | 6/1994 | Dupuis |
| 5,332,511 A | 7/1994 | Gay et al. |
| 5,348,665 A * | 9/1994 | Schulte et al. ............. 210/748 |
| 5,382,367 A | 1/1995 | Zinkan et al. |
| 5,422,014 A | 6/1995 | Allen et al. |
| 5,424,032 A | 6/1995 | Christensen et al. |
| 5,470,480 A | 11/1995 | Gray et al. |
| 5,489,344 A | 2/1996 | Martin et al. |
| 5,494,588 A | 2/1996 | LaZonby et al. |
| 5,518,629 A | 5/1996 | Perez et al. |
| 5,575,920 A | 11/1996 | Freese et al. |
| 5,587,069 A * | 12/1996 | Downey, Jr. ............... 210/192 |
| 5,639,476 A | 6/1997 | Oshlack et al. |
| 5,658,467 A | 8/1997 | LaZonby et al. |
| 5,683,654 A | 11/1997 | Dallmier et al. |
| 5,736,097 A | 4/1998 | Ono |
| 5,770,039 A | 6/1998 | Rigney et al. |
| 5,779,912 A * | 7/1998 | Gonzalez-Martin et al. 210/748 |
| 5,783,092 A | 7/1998 | Brown et al. |
| 5,785,867 A | 7/1998 | LaZonby et al. |
| 5,800,732 A | 9/1998 | Coughlin et al. |
| 5,814,233 A | 9/1998 | Starkey et al. |
| 5,814,247 A | 9/1998 | Derule et al. |
| 5,820,256 A | 10/1998 | Morrison |
| 5,849,985 A | 12/1998 | Tieckelmann et al. |
| 5,855,791 A | 1/1999 | Hays et al. |
| 5,858,246 A | 1/1999 | Rafter et al. |
| 5,858,249 A | 1/1999 | Higby |
| 5,866,013 A | 2/1999 | Kessler et al. |
| 5,882,526 A | 3/1999 | Brown et al. |
| 5,888,374 A | 3/1999 | Pope et al. |
| 5,895,565 A | 4/1999 | Steininger et al. |
| 5,902,751 A | 5/1999 | Godec et al. |
| 5,947,596 A | 9/1999 | Dowd |
| 5,972,196 A | 10/1999 | Murphy et al. |
| 5,980,758 A | 11/1999 | LaZonby et al. |
| 5,985,155 A | 11/1999 | Maitland |
| 6,015,484 A | 1/2000 | Martinchek et al. |
| 6,030,842 A | 2/2000 | Peachy-Stoner |
| 6,045,706 A | 4/2000 | Morrison et al. |
| 6,068,012 A | 5/2000 | Beardwood et al. |
| 6,106,770 A | 8/2000 | Ohki et al. |
| 6,120,619 A | 9/2000 | Goudiakas et al. |
| 6,120,698 A | 9/2000 | Rounds et al. |
| 6,132,593 A | 10/2000 | Tan |
| 6,143,184 A | 11/2000 | Martin et al. |
| 6,146,538 A | 11/2000 | Martin |
| 6,149,819 A | 11/2000 | Martin et al. |
| 6,159,552 A | 12/2000 | Riman et al. |
| 6,238,555 B1 | 5/2001 | Silveri et al. |
| 6,284,144 B1 | 9/2001 | Itzhak |
| 6,315,950 B1 | 11/2001 | Harp et al. |
| 6,409,926 B1 | 6/2002 | Martin |
| 6,419,817 B1 | 7/2002 | Martin |
| 6,423,234 B1 | 7/2002 | Martin |
| 6,503,464 B1 * | 1/2003 | Miki et al. ............... 422/186.3 |
| 2002/0043650 A1 | 4/2002 | Martin |
| 2002/0152036 A1 | 10/2002 | Martin |

OTHER PUBLICATIONS

Dexter et al., "Use and Limitations of Electrochemical Techniques for Investigating Microbiological Corrosion", Corrosion, 1991, vol. 47, No. 4, pp. 308–318.

Gusmano et al., "Electrochemical Noise Resistance as a Tool for Corrosion Rate Prediction", Corrosion, 1997, vol. 53, No. 11, pp. 860–868.

U.S. Filter/Stranco, "Ryznar Stability Index The $3^{rd}$ Dimension Needed for Proper 'Water Balance,'" Aquatic Technology Newsletter, vol. 1, pp. 1–3.

U.S. Filter/Stranco, "Total Dissolved Solids, Friend or Foe?", Aquatic Technology Newsletter, vol. 1, No. 2, 1988; pp. 1–7.

U.S. Filter/Stranco, "The Relationship of ORP to PPM and Its Automated Control," Aquatic Technology Newsletter, vol. 1, No. 3, 1999, pp. 1–5.

U.S. Filter/Stranco, "The Chemistry and Control of Chloramines," Aquatic Technology Newsletter, vol. 1, No. 4, 1999, pp. 1–5.

U.S. Filter/Stranco, "Yes, Your Pool Needs Calcium Too," Aquatic Technology Newsletter, vol. 1, No. 5, pp. 1–3.

U.S. Filter/Stranco, "Why Do I Have Algae In My Pool?" Aquatic Technology Newsletter, vol. 1, No. 6, 1999, pp. 1–2.

Carpenter, Colleen et al., "Chlorine Disinfection of Recreational Water for *Cryptosporidium parvum,*" *Emerging Infectious Diseases,* vol. 5, No. 4, Jul.–Aug. 1999, pp. 579–584.

U.S. Filter/Stranco, "ECS–Pool (w/CHF–150) Engineering Packet," Apr. 22, 1999.

Kowalsky, L., "Pool–Spa Operators Handbook," National Swimming Pool Foundation, 1983–1990.

Lynntech, Inc., "Electrochemical Ozone Generator," Model 124 Product Literature, date unknown.

U.S. Filter/Stranco, "Strantrol Automated Water Chemistry Control for Commercial Pools," 1998.

U.S. Filter/Stranco, "Strantrol System 3 Pool & Spa Chemistry Controller," 2000.

U.S. Filter/Stranco, "Strantrol System 4 Pool & Spa Chemistry Controller," 2000.

U.S. Filter/Stranco, "Strantrol System5F Pool & Spa Chemistry Controller," 2000.

U.S. Filter/Stranco, "Strantrol System6 Pool Chemistry & Filter Backwash Controller," 2000.

U.S. Filter/Stranco, "Strantrol System7 Mechanical Room Controller for Aquatic Facilities," 2000.

Kloberdanz, B., "The Air in There: Enhancing an Indoor Pool Environment," Recreation Management, 2000.

Selvick, E., "Take Control of 'Yo-Yo' Treatment Cycles," International Aquatics, National Trade Publications, Inc., Jul./Aug. 1997.

Frazier, B., "Automation to the Rescue," Aquatics International, May/Jun. 1998.

Batt, T. et al., "The Water Down Under," Parks & Recreation, Nov. 1999.

Krone, D., "Automated Water Chemistry Control at University of Virginia Pools," Facilities Manager, vol. 13, No. 6, Nov./Dec. 1997.

U.S. Filter/Stranco, "Remote Monitoring for Unstaffed Pools," Parks & Recreation, Nov. 1997.

Minton, E., "On the Waterpark," Swimming Pool/Spa Age, date unknown.

U.S. Filter/Stranco, "Environmental Control at Indoor Pool: New ECS System Eliminates Chronic Air Quality Woes for New York School District Pool," Stranco Products Capsule Case History #806, Jul.1998.

U.S. Filter/Stranco, "Environmental Control at Indoor Pool Complex: New ECS System Optimizes Air & Water Quality at Colorado Recreation Center," Stranco Products Capsule Case History #807, Nov. 1998.

U.S. Filter/Stranco, "Environmental Control at Indoor–Pool: Parks District Uses New ECS System to Eliminate Chronic Air Quality Problems at High School Pool," Stranco Products Capsule Case History #808, May 1999.

U.S. Filter/Stranco, "Environmental Control at Indoor Pool: ECS System Optimizes Air & Water Quality at Texas School District Swim Center," Stranco Products Capsule Case History #811, Nov. 1999.

U.S. Filter/Stranco, "Environmental Control at Special Indoor Pool: New ECS System Eliminates Chronic Air Quality Woes in School District Pool & Spa Serving Special Needs Children," Stranco Products Capsule Case History #812, Oct. 1999.

U.S. Filter/Stranco, "Environmental Control at Indoor Pool: ECS System Eliminates Chronic Air Quality Problems at High School and Parks District Indoor Pool Facility," Stranco Products Capsule Case History #813, Jul. 2000.

U.S. Filter/Stranco, "Environmental Control at Indoor Pool: ECS System Optimizes Air & Water Quality at Iowa Recreation Center," Stranco Products Capsule Case History #814, May 2000.

U.S. Filter/Stranco, "Air & Water Quality Control for Indoor Aquatic Facilities," U.S. Filter Corporation, 1998.

U.S. Filter/Stranco, "Strantrol ECS—Environmental Control System (For Pool)," 2000.

U.S. Filter/Stranco, "Abstracts of Strancol ECS Case Histories," date unknown.

Williams, K., "Aquatic Facility Operator Manual," National Recreation and Park Association, Second Edition, 1995.

Normenausschusse Wasserwesen, "Treatment and disinfection of water used in bathing facilities," DIN 19643–4, Feb. 1999.

Normenausschusse Wasserwesen, "Treatment and disinfection of water used in bathing facilities," DIN 19643–3, Apr. 1997.

Normenausschusse Wasserwesen, "Treatment and disinfection of water used in bathing facilities," DIN 19643–2, Apr. 1997.

Normenausschusse Wasserwesen, "Treatment and disinfection of water used in bathing facilities," DIN 19643–1, Apr. 1997.

Stranco, "The Best of Poolfax," The Poolfax Newsletter, 1981–1984.

Victorin et al., "Redox potential measurements for determining the disinfecting power of chlorinated water," *J. Hyg., Comb.,* 70, 1972, pp. 313–323.

U.S. Filter/Stranco, "Environmental Control System Training Meeting, Mar. 15, 2000".

Kim, Yong H., "Evaluation of Redox Potential and Chlorine Residual as a Measure of Water Disinfection," presented at the 54th International Water Conference, Pittsburgh, PA, Oct. 11–13, 1993.

Scully et al., Disinfection Interference in Wastewaters by Natural Organic Nitrogen Compounds, *Environ. Sci. Techn.,* vol. 30, No. 5, 1996, pp. 1465–1471.

White, Geor. Clifford, Handbook of Chlorination and Alternative Disinfectants, Third Edition, date unknown, pp. 801, 803–809, 922–924.

Carlson, S., "Fundamentals of water disinfection," *J Water SRT—Aqua,* vol. 40, No. 6, (1991), pp. 346–356.

Lund, E., "Oxidative Inactivation of Poliovirus," from the Virological Laboratory of the Department of Bacteriology, University of Gothenburg, and the Virological Department of the Municipal Laboratories, Gothenburg, Sweden, Springer–Verlag, (1963), pp. 1–49.

Lund et al., "The Effect of Oxidation and Reduction on the Infectivity of Poliomyelitis Virus," from the Virological Laboratory of the Department of Bacteriology, University of Gothenburg, and the Virological Department of the Municipal Laboratories, Gothenburg, Sweden, Springer–Verlag, (1961), pp. 100–110.

Lund, E., "Inactivation of Poliomyelitis Virus by Chlorination at Different Oxidation Potentials," from the Virological Laboratory of the Department of Bacteriology, University of Gothenburg, and the Virological Department of the Municipal Laboratories, Gothenburg, Sweden, Springer–Verlag, (1961), pp. 330–342.

Lund, E., "The Significance of Oxidation in Chemical Inactivation of Poliovirus," from the Virological Laboratory of the Department of Bacteriology, University of Gothenburg, and the Virological Department of the Municipal Laboratories, Gothenburg, Sweden, Springer–Verlag, (1963), pp. 1–13.

Lund, E., "The Rate of Oxidative Inactivation on Poliovirus and its Dependence of the Concentration of the Reactants," from the Virological Laboratory of the Department of Bacteriology, University of Gothenburg, and the Virological Department of the Municipal Laboratories, Gothenburg, Sweden, Springer–Verlag, (1963), pp. 1–18.

Stranco, "Solutions: Effluent Dechlorination", Stranco Product Literature, date unknown.

Hensley, R. et al., "Disinfection Metamorphosis: From Chemicals to Control," *Operations Forum,* vol. 12, No. 4, Apr. 1995.

Hetzler, J.T. et al., "ORP: A Key to Nutrient Removal," *Operations Forum,* vol. 12, No. 2, Feb. 1995.

Bossard, G. et al., "Optimizing Chlorination/Dechlorination at a Wastewater Treatment Plant," reprinted from *Public Works,* Jan. 1995.

Eddington, Gordon, "Successfully Managing Wastewater Chloration," Stranco Product Literature, date unknown.

Ryan, D. et al., "Waste Not Want Not:Avoiding Chemical Excesses," reprinted from *Operations Forum,* vol. 11, No. 4, Apr. 1994.

D'Adam, D. et al., "A Case Study of Wastewater Plant Disinfection," reprinted from *Public Works Magazine,* Nov., 1994.

"Louisiana Plant Uses New Technology for Dechlorination," reprinted from *American City & County,* Feb. 1994.

Kiser, P. et al., "ORP or Residual: Which Measures Oxidation?" Sep. 10, 1992, pp. 1–7.

"Aquasol Controllers: Chemical Automation for Pools and Spas," Product Literature, date unknown.

"Pool and Spa Controller: Acu–200 Pool Management Software," Product Literature, date unknown.

"Acu–Trol Programmable Controllers," Product Literature from www.acu–trol.com, printed Nov. 19, 1999.

Santa Barbara Control Systems, "Chemtrol™ PC Programmable Controllers: Integrated Water Treatment with Remote Control," Product Literature, date unknown.

"Chemtrol Automatic Pool Controllers," Product Literature from www.sbcontrol.com, printed Nov. 19,1999.

"Chemtrol–PC6000 Controller," Product Literature from www.sbcontrol.com, printed Nov. 19, 1999.

"Chemtrol–PC3000 Controller," Product Literature from www.sbcontrol.com, printed Nov. 19, 1999.

"AK100 Swimming Pool Control Systems," Product Literature from www.acu-trol.com, printed Nov. 19, 1999.

Acu–trol, "AK100 Series," Product Literature, date unknown.

Acu–Trol, "Acu–Trol Programmable Controllers: AK100 Series and AK200," Product Literature.

Aquasol Controllers, Inc., "Aquasol WTC," Product Literature, date unknown.

Aquasol Controllers, Inc., "What is a Controller?" Product Literature from www.aquasol.com, printed Nov. 19, 1999.

Aquasol Controllers, Inc., "Aquasol WTC Specifications, " Product Literature from www.aquasol.com, printed Nov. 19, 1999.

Aquasol Controllers, Inc., "Aquasol SPC Specifications," Product Literature from www.aquasol.com, printed Nov. 19, 1999.

Acu–Trol, "AK100 Summary," Product Literature from www.acu–trol.com, printed Nov. 19, 1999.

CAT Controllers, "CAT 2000+ Programmable Water Chemistry Controller," Product Literature date unknown.

Rola–Chem Corporation, "The New Wave in Water Management: Take Control with Rola–Chem," Product Catalog, Apr. 1999.

Strand, R. et al., "ORP As a Measure of Evaluating and Controlling Disinfection in Potable Water," Source and date unknown.

Mansfeld et al., "Electrochemical Noise Analysis of Iron Exposed to NaCl Solutions of Different Corrosivity, " *J. Electrochem. Soc.,* vol. 141, No. 5, May 1994, pp. 1402–1404.

Brusamarello et al., "Analysis of Different Methods to Calculate Electrochemical Noise Resistance Using a Three–Electrode Cell," *Corrosion,* vol. 56, No. 3, Mar., 2000, pp. 273–282.

Mansfeld et al., "Electrochemical Noise Analysis of Iron Exposed to NaCl Solutions of Different Corrosivity," *J. Electrochem Soc.,* vol. 140, No. 8, Aug. 1993, pp. 2205–2209.

* cited by examiner

FREE RADICAL GENERATOR AND METHOD

BACKGROUND OF THE INVENTION

1. Field of the Invention

The present invention relates to apparatus for generating free radical species and particularly to hydroxyl free radical generators and methods of use in water treatment facilities.

2. Description of Related Art

The use of aquatic systems for use by the general public, for example, swimming pools, spas, hot tubs, decorative fountains, cooling towers and the like, has led to a variety of water quality problems. For instance, improper chemical balances in the water can lead to various types of contamination including bacterial and viral contamination. To address such problems, pool operators have turned to the use of chemical sanitizers as a typical water sanitation method. Halogen donor compounds, such as chlorine or bromine can be effective sanitizers so long as they are maintained at well-defined and constantly controlled concentration levels in the water. It is important that the concentration of these chemical sanitizers is not allowed to become too high and possibly cause irritation to the users and damage to the water system. Insufficient sanitizers may result in a contaminated condition. Other systems have been developed. For example, Ruffin in U.S. Pat. No. 3,079,498 discloses a swimming pool water purifier that provides germicidal ultraviolet radiation to a stream from and to the swimming pool.

Other efforts aimed at sanitization or treating aquatic systems have been disclosed. For example, Czulak et al., in U.S. Pat. No. 3,336,099, disclose an apparatus for the sanitization of liquids with special application to water storages and swimming pools by passing such a liquid from the swimming pool around an ultraviolet radiation source to expose the liquid to said radiation. Koubek, in U.S. Pat. No. 4,012,321, discloses oxidation of refractory organics in aqueous waste streams by hydrogen peroxide and ultraviolet light by introducing the liquid to be treated in a photolysis chamber, to expose the liquid to the ultraviolet light. Pisani, in U.S. Pat. No. 4,906,387, discloses a method for removing oxidizable contaminants in cooling water used in conjunction with a cooling tower by including means for removing a portion of the recirculating water which passes through the cooling tower to create a slipstream of water to be treated and treating the slipstream water with chemicals to provide a hydroxyl free radical into the water to enhance oxidation, inducing cavitation in the slipstream water, then irradiating the slipstream water with ultraviolet radiation to thereby cause the oxidizable contaminants to be oxidized and therefore removed before the slipstream water is reintroduced back into the cooling tower. Cater et al., in U.S. Pat. No. 5,043,080, disclose treating contaminated effluents and ground waters wherein the liquid effluent or ground water containing the organic contaminants is contacted with hydrogen peroxide and transition metal ions; the hydrogen peroxide and transition metal ions are present in effective amounts based on the concentration of the organic contaminants in the liquid and the liquid effluent is then irradiated with ultraviolet light to decompose the organic contaminants. Weres et al., in U.S. Pat. No. 5,439,577, disclose an electrochemical device for generating hydroxyl free radicals in the treated water using a novel electrode which is capable of operation at sufficiently positive anodic potential to produce the hydroxyl radicals in the treated water.

SUMMARY OF THE INVENTION

According to one embodiment, the present invention provides a water system comprising a body of water and a free radical generator comprising an inlet connectable to a substantially pure water source, a channel fluidly connected to the inlet, the channel disposed to flow the substantially pure water therethrough, an ultraviolet radiation emission source disposed to irradiate the substantially pure water and generate free radicals therein, and an outlet fluidly connected to the body of water.

According to another embodiment, the present invention provides a method of minimizing undesirable species in a water system. The method comprises providing substantially pure water to a free radical generator, irradiating the substantially pure water with ultraviolet radiation to produce a solution comprising free radicals, and adding the solution to the aquatic system.

According to another embodiment of the present invention, a method for disinfecting an aquatic system is provided. The method includes providing a low oxygen demand liquid to a hydroxyl free radical generator, irradiating the low oxygen demand liquid with actinic radiation to generate hydroxyl free radicals in the liquid, and adding the hydroxyl free radicals to the aquatic system.

According to another embodiment of the present invention, a method for facilitating treating a water facility is provided. The method includes providing a reactor comprising a water inlet fluidly connectable to a substantially pure water source, a channel fluidly connected to the inlet, the channel disposed to flow the substantially pure water therethrough, an ultraviolet radiation emission source disposed to irradiate the substantially pure water and generate hydroxyl free radicals therein and an outlet downstream of the ultraviolet radiation emission source, the outlet fluidly connectable to the water facility.

In another embodiment, the present invention provides a method of operating a water system. The method comprises the steps of providing a reactant solution consisting essentially of substantially pure water, irradiating the reactant solution with ultraviolet light to produce an oxidant solution having free radical species and mixing the oxidant solution with water in the water system.

In another embodiment, the present invention provides a water system. The water system comprises a reactant solution source providing reactant solution consisting essentially of water substantially free of free radical consuming contaminants and an ultraviolet radiation source fluidly connected to the reactant solution source and constructed and arranged to irradiate the reactant solution and fluidly connected to water in the water system.

Other advantages, novel features, and objects of the invention should become apparent from the following detailed description of the invention when considered in conjunction with the accompanying drawings, which are schematic and are not intended to be drawn to scale. In the figures, each identical or substantially similar component that is illustrated, is represented by a single numeral or notation. For clarity, not every component is labeled in every figure nor is every component shown where illustration is not necessary to allow those of ordinary skill in the art to understand the invention.

BRIEF DESCRIPTION OF THE DRAWINGS

Preferred, non-limiting embodiments of the present invention will be described by way of example with reference to the accompanying drawings, in which.

DETAILED DESCRIPTION

The present invention, in one aspect provides an apparatus for generating free radical species can be used to sanitize or minimize undesirable species that create an oxygen demand in water systems. The apparatus generates hydroxyl free radical species using substantially pure water, or using a liquid that is substantially free of oxygen-reactive species, to maximize free radical species generation to sanitize the water system. The free radical species are generated by ultraviolet radiation having a wavelength of less than or equal to 254 nm.

Figure 1:
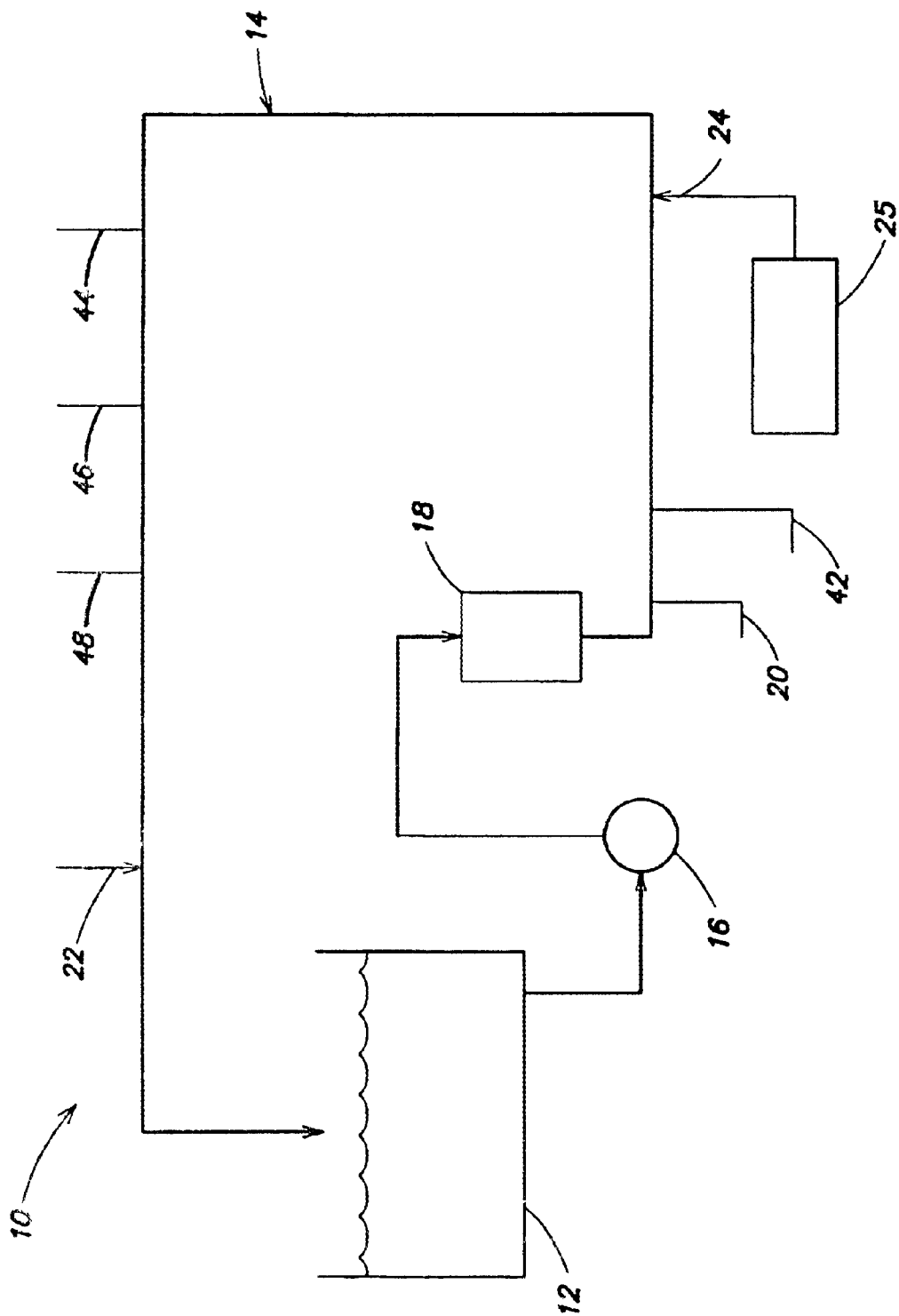
FIG. 1 is a schematic diagram showing a water system according to one embodiment of the present invention.

According to one embodiment, the present invention provides a water or aquatic system as schematically illustrated in FIG. 1. The water system 10 can comprise a body of water 12 and a circulation system 14. Circulation system 14 typically includes a pump 16 and optionally an in-line filter 18 so that as water is withdrawn from body of water 12, it can be filtered as it passes through circulation system 14 before being returned to body of water 12. Optionally connected to circulation system 14 are sensor element 20 and connections or ports 22 and 24. In some cases, water system 10 can comprise body of water 12 fluidly connected to a free radical generator through, for example, port 22 or 24.

The hydroxyl free radical is one of the most powerful oxidizers. Because of its high oxidation potential, hydroxyl free radical species and other oxygen radicals, used herein as oxidants, can be used to oxidize oxidation-resistant compounds.

According to one embodiment, the present invention provides improved efficiency of oxidant production while utilizing comparably low power and relatively minimal capital and operating expense. The present invention can provide a method for improved control of oxidant concentration and delivery based on specific requirements and needs as well as measured program performance. In some cases, producing oxidants in an environment that is beneficial for their production would produce higher concentrations as well as improved efficiency. Accordingly, in one embodiment, the present invention provides an apparatus for generating free radical species as oxidants from a solution, typically the reactant solution, that is substantially free of a species that would oxidize such free radicals. For example, a reactant solution can be substantially pure water or it can be a solution that has a low chemical or biological oxygen demand level. By reducing the potential for competing reactions through the elimination of any unwanted or undesired organic or inorganic contaminants that may consume free radical species, the stability of such species is thereby improved. Thus, for example, the free radical generator apparatus according to some embodiments of the present invention has a low power consumption, such as about or less than 100 KW, in some cases, about or less than 10 KW and, in other cases, about or less than 1 KW for a water system that has about or greater than 10,000 gallons of water.

Figure 4:
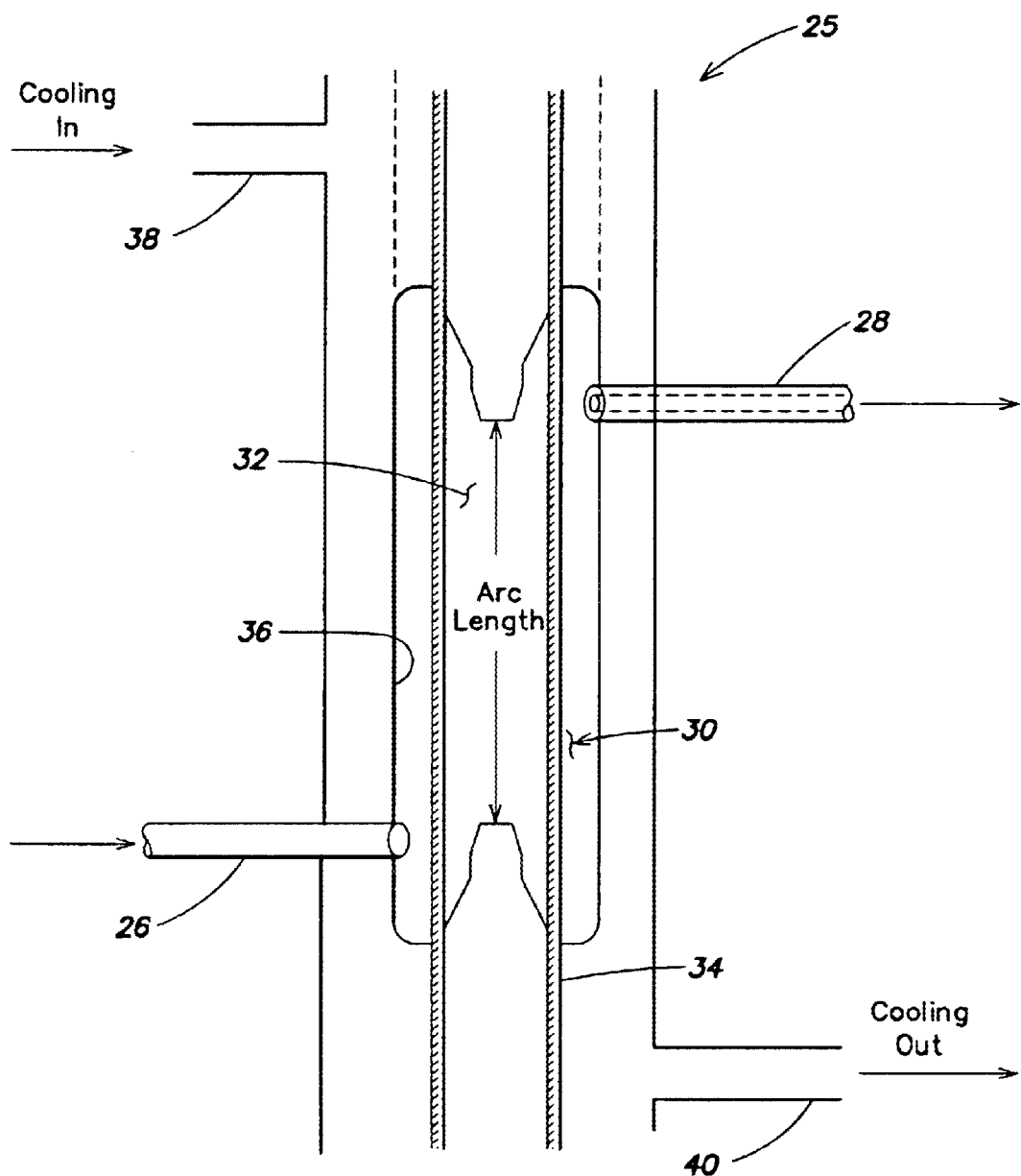
FIG. 4 is a schematic diagram of a free radical species generator according to one embodiment of the present invention.

In another embodiment, the present invention provides a system, and a method, for employing and delivering an oxidant solution comprising free radical species, such as, but not limited to, hydroxyl free radical species (OH•), to a water system or a body of water to be treated using a free radical generator. The free radical generating apparatus, according to one embodiment of the present invention, is schematically illustrated in FIG. 4. The free radical generator 25 can have an inlet 26 and an outlet 28. Connecting the inlet and the outlet is typically a channel 30. Channel 30 can have a variety of shapes and configurations to allow the reactant solution to flow therethrough and, in some cases, maximize the incident exposure of the reactant to actinic radiation. For example, channel 30 can be shaped as a cylindrical or an annular chamber. According to one embodiment, within the chamber resides an actinic radiation source 32 contained within a transparent wall 34. The free radical generator can comprise a channel that fluidly connects to the inlet and is disposed to flow the reactant solution, such as substantially pure water, therethrough. The free radical generator can also comprise a source of actinic radiation that is disposed to irradiate the substantially pure water flowing along the channel such that upon irradiation, free radicals are generated therein. In some cases, outlet 28 of the free radical generator is fluidly connected to circulation system 14 at port 24. In some cases the actinic radiation source emits electromagnetic radiation in the ultraviolet range, preferably with a wavelength that is less than 300 nanometers and more preferably with a wavelength that is less than 254 nanometers. Examples of actinic radiation sources are available commercially from, for example, Aquionics Incorporated (Erlanger, Ky.). The intensity of the actinic radiation source can vary, typically, decreasing, after, a period of use. For example, the rated intensity or dosage of a specific ultraviolet lamp can decrease over time as described by Rodriguez et al. in "Disinfection, Liquid Purification by UV Radiation, and Its Many Applications," *Ultrapure Water*, September 1991, pages 22–30. Typically, an ultraviolet lamp is rated according at its end of lamp life to insure minimum dosage levels. The present invention is not limited to a particular low or medium pressure lamp; thus, either or both may be used provided the lamp has sufficient intensity to initiate or generate the required free radical species yield.

Inlet 26, according to one embodiment, provides a reactant solution that is irradiated by the actinic radiation. According to some embodiments, the reactant solution has a low oxygen demand or processed to have a low oxygen demand. In some cases, the reactant solution comprises substantially pure water or a liquid that has a low chemical or biological oxygen demand. Outlet 28 can provide oxidant solution, which typically contains the produced free radical species for introduction into body of water 12.

Reactor sleeve or wall 34 typically encases or surrounds actinic radiation source 32 and separates it from the irradiated reactant solution and, typically, the oxidant solution. According to one embodiment, wall 34 comprises a quartz sleeve that is transparent to electromagnetic radiation having a wavelength of less than or equal to 300 nm. As shown in the embodiment of FIG. 4, channel 30 can be formed as the volume enclosed within cylindrical surface 36. Channel 30 can also be referred to as the reaction chamber and can be defined as the cylindrical section located between wall 34 and having a length about equal to the arc length of the actinic radiation source. The arc length is typically defined as the distance between the electrodes of the actinic radiation source such as the ultraviolet lamp. Those skilled in the art would readily be able to design and construct an actinic radiation source suitable to irradiate the reactant solution to emit electromagnetic radiation with a wavelength, typically less than or about 254 nm, that can generate free radical species.

According to another embodiment, wall 34 separates ultraviolet lamp 32 from the reactant solution while providing high transmittance of actinic radiation. Examples of suitable materials that can be used as wall 34 include, but are not limited to, natural or synthetic quartz because of its high transmittance of ultraviolet radiation.

The separation distance between sleeve 34 and surface 36 can vary between 0.1 mm to 100 mm. The volume enclosed within channel 30, along with the volumetric flow rate, defines the irradiation time or exposure time of the reactant solution to the actinic radiation. Free radical generator 25 can be constructed based on the required flow rate of the oxidant solution and the volume of channel 30, to have an irradiation time of about 1 second to about 100 seconds, and in some cases, with an irradiation time of between 2 to 20 seconds.

Surface 36 of channel 30 can be comprised of any material having suitable chemical and mechanical resistance to the reactant solution and oxidant solution. Such materials include, but are not limited to, titanium, stainless steel, copper, ceramic, plastic, or combinations thereof. In some cases, surface 36 can be coated to provide the appropriate or even selective chemical and ultraviolet resistance depending on use or other considerations such as, but not limited to, capital or maintenance costs. In other cases, surface 36 can be coated or prepared to have a reflective surface so that any radiation incident on surface 36 can be reflected back into the reactant solution. In other cases, surface 36 can have a coating that catalytically promotes free radical hydroxyl formation. For example, surface 36 can be coated with titanium dioxide. Those skilled in the art would recognize that channel 30 can be constructed or arranged to have surface 36 that exhibits a desirable combination of properties including, but not limited to being chemically stable, low cost, and catalytically active.

In operation, the generation of oxidant solution comprising free radical species, using free radical generator 25 and reactant solution, depends on several factors including, for example, the flow rate of reactant solution flowing within chamber 30, the intensity or power as well as the wavelength or wavelength spectrum of actinic radiation source 32 as well as the presence of free radical-consuming species present in the reactant solution, for example, the substantially pure water source (not shown). Other factors that may effect the concentration or the abundance of free radical species generated and available for use in system 10 include the presence of contaminating organic or inorganic species in, for example, the substantially pure water solution which can lead to, in some cases, undesirable competing reactions. In some cases, the reactant solution can be water that has been, for example, purified, such as by filtration, electrodeionization, electrodialysis, reverse osmosis, distillation, ion exchange, or combinations thereof. Further, the contact, residence or irradiation time of the reactant solution during exposure to the actinic radiation as well as the distance of photon travel, the number of photon collisions and the presence or absence of a catalyst within chamber 30 during the exposure to actinic radiation can affect the yield of the free radical species.

In another embodiment, the reactant solution is solution that has a low NTU value as well as having low total dissolved solids. Typically, the reactant solution has an NTU value below 100, or even less than 1. In other cases, the total dissolved solids content is typically below 2,000 ppm or even less than 100 ppm. Accordingly, in some embodiments, the composition of the reactant solution is conducive to provide stability to free radicals by having little or no species that would consume the produced free radical species. Further, survivability of such free radical species may depend on the pH of the reactant solution. Accordingly, the pH of the reactant solution is typically low or below about 10, or below about 9, or even below about 8.

According to another embodiment, the reactant solution further includes free radical donors that, for example, upon irradiation by the actinic radiation, can release, initiate or generate free radical species such as, but not limited to OH•. Examples of such donors include, but are not limited to, hydrogen peroxide, ozone, oxygen, singlet oxygen, other peroxide donors as well as peroxygen compounds. Typically, such donors would have a low level of dissolved solids when introduced into the reactant solution to minimize potentially undesirable competing reactions that can consume free radicals thereby affecting the yield of free radicals. For example, peroxygen compounds as peroxide donors that can increase dissolved solids that can react with the hydroxyl radical species include, but are not limited to, peroxodisulfate ions ($S_2O_8^{-2}$) and hydrogen peroxomonosulfate ($HSO_5^-$). Such species can reduce the overall efficiency of free radical species production because they can consume generated free radicals. However, in some cases, salt-based reactants may be beneficial for other reasons. For example, using peroxide donors available in dry powder form may be more convenient for operational purposes even though their use may reduce the overall free radical yield.

In another embodiment, free radical generator 25 can be cooled during operation. For example, as shown in FIG. 4, a cooling medium entering through cooling inlet 38 can carry away heat generated during the irradiation process out through cooling outlet 40 to a cooling unit operation (not shown). Suitable cooling media can include water or other fluids as known in the art. The flow of the cooling media can be either in counter-current or co-current flow relative to the reactant solution.

EXAMPLE

In this example, the generation of hydroxyl free radicals and their effectiveness in oxidizing or minimizing undesirable contaminants as measured by, for example, COD, in a body of water was evaluated. Specifically, water system 10, schematically shown in FIG. 1. using the free radical generator 25, schematically shown in FIG. 4, was used. Free radical generator 25 had a reactor sleeve having a surface 36 made of 316 L stainless steel and used a synthetic high-purity fused quartz sleeve 34 to encase a 1 KW medium pressure ultraviolet lamp from Alpha-Cure LTD (Norhants, United Kingdom). TEFLON™ fluoropolymer, available from E. I. du Pont de Nemours and Company (Wilmington, Del.), was used for the seals and connectors. Free radical generator 25 was operated with a reactant solution flow rate of about 220 ml per minute and irradiation (UV contact) time of about 11.4 seconds to produce a reactant solution having about 0.5% strength as active $H_2O_2$. Distilled water or water pretreated by filtration and reverse osmosis was used as the reactant solution. Water system 10 had a body of water that was about 13,000 gallons and had a circulation flow rate through circulation system 14 of about 500 gallons per minute. The body of water had an initial contaminant, glycine, concentration of about 4.6 ppm.

During operation, several samples were retrieved from circulation system 14 as well as body of water 12 and evaluated for chloramine, measured as combined chlorine, as well as TOC to evaluate the effectiveness of the hydroxyl free radicals generator. Samples were retrieved and analyzed at sample point 42 from circulation system 14 approximately 3 to 5 feet before hydroxyl free radical introduction at port 24. Samples were retrieved and analyzed at sample point 44 approximately 3 to 5 feet after hydroxyl free radical introduction. Samples were retrieved and analyzed at sample point 46 approximately 8 to 10 feet after hydroxyl free radical introduction. And, samples were retrieved and analyzed at sample point 48 approximately 15 to 20 feet after hydroxyl free radical introduction. A nozzle was used in port 24 to introduce the oxidant solution having hydroxyl free radicals to accelerate the mixing of the oxidant solution from free radical generator 25 within the stream flowing in circulation system 14.

Figure 2:
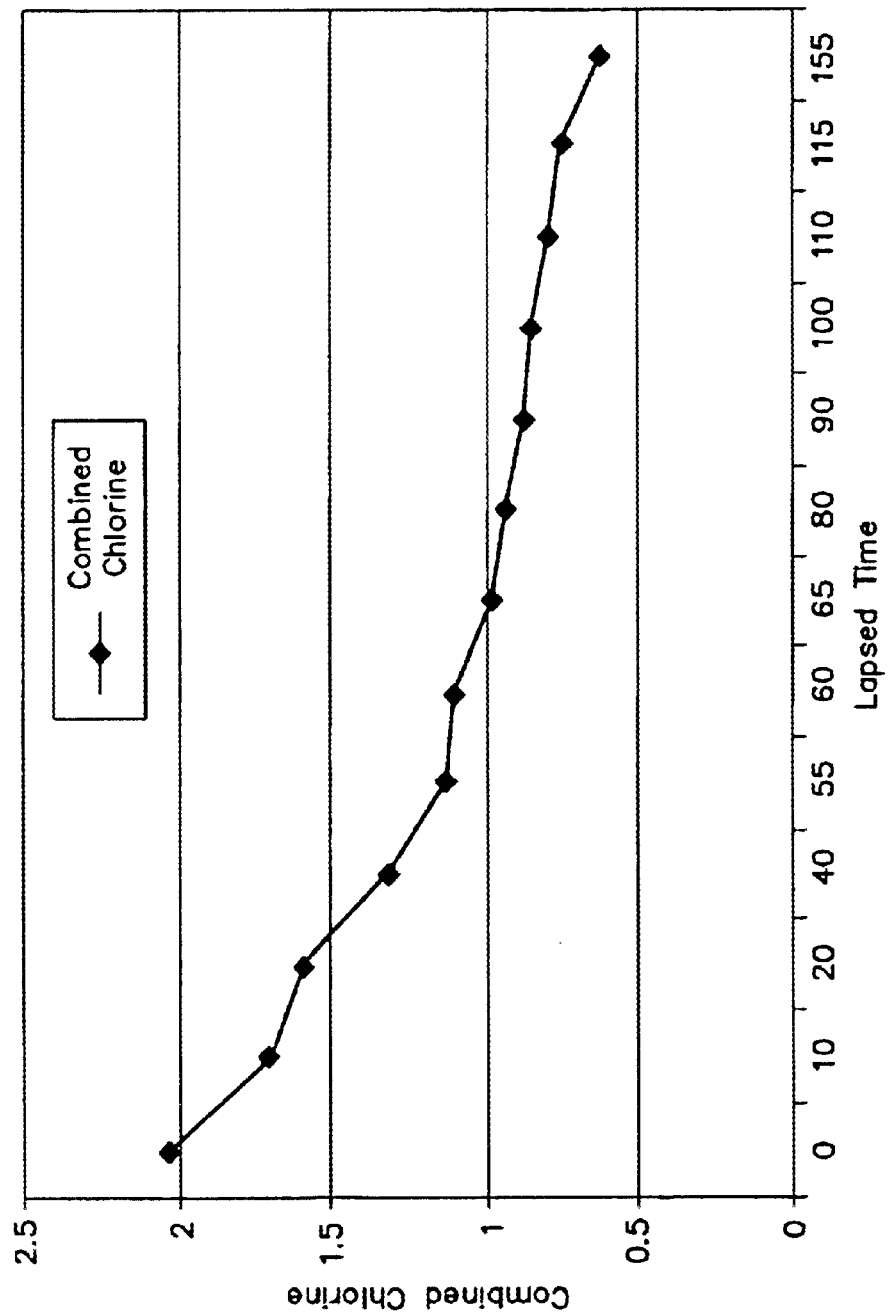
FIG. 2 is a graph showing the reduction in chloramine, as combined chlorine, after the introduction of hydroxyl free radical species into the water system schematically illustrated in FIG. 1.
Figure 3:
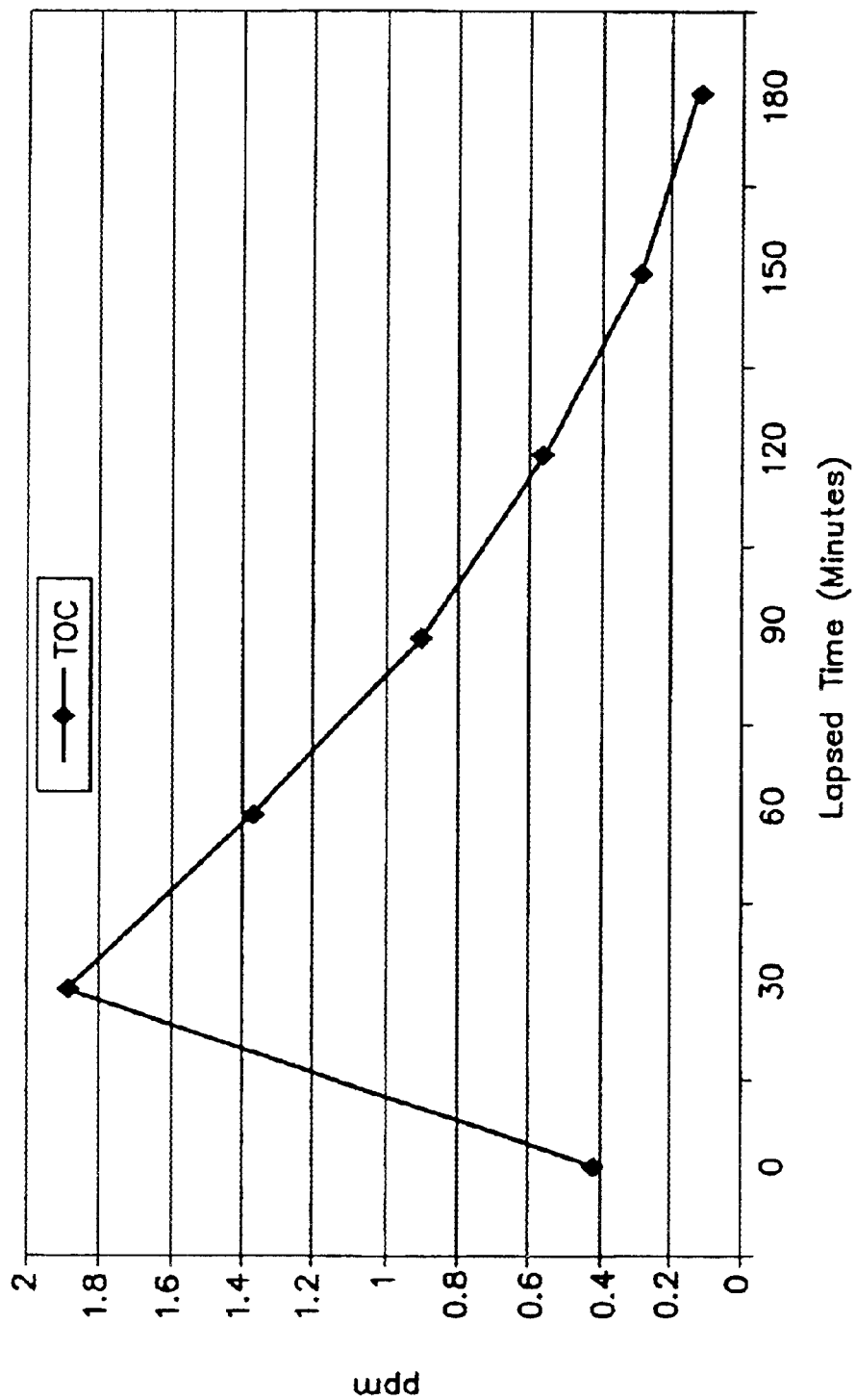
FIG. 3 is a graph showing the rate of TOC reduction using the hydroxyl free radical generator as a function of elapsed time as used in the water system schematically shown in FIG. 1.

FIGS. 2 and 3 show the measured chloramine and TOC concentrations, respectively, as function of time after the introduction of the hydroxyl free radical species. FIG. 2 shows that chloramine, as combined chlorine, was consumed by the hydroxyl free radical species and reduced to below 1 ppm after about 65 minutes of operation. Similarly, FIG. 3 shows that TOC was reduced by the use of hydroxyl free radical species to below 1 ppm after about 90 minutes of operation. Thus, the example demonstrates that water system can be treated using hydroxyl free radicals according to the apparatus and method of the present invention.

Those skilled in the art should appreciate that all parameters and configurations described herein are meant to be exemplary and that actual parameters and configurations will depend upon the specific application in which the systems and methods of the present invention are used. Those skilled in the art should recognize, or be able to ascertain, using no more than routine experimentation, many equivalents to the specific embodiments of the invention described herein. For example, those skilled in the art should recognize that multiple free radical generators can be used to treat a water system or that a plurality of free radical generators can be used, each having different or adjustable power ratings to compensate for, for example, wear or reduced yield with aging. It is, therefore, to be understood that the foregoing embodiments are presented by way of example only and that, within the scope of the appended claims and equivalents thereto, the invention may be practiced otherwise than as specifically described. For example, the reactant solution can be treated to have a low oxygen demand to remove free radical-consuming species. The present invention is directed to each feature, system, or method described herein. In addition, any combination of two or more features, systems or methods, if such features, systems or methods are not mutually inconsistent, is considered to be within the scope of the present invention.

What is claimed is:

1. A method of reducing oxygen demand in a water system comprising:

providing a low oxygen demand liquid to a hydroxyl free radical generator;

irradiating the low oxygen demand liquid with actinic radiation to generate hydroxyl free radicals; and adding the low oxygen demand liquid comprising the hydroxyl free radicals to the water system, wherein the low oxygen demand liquid is not water from the water system.

2. The method of claim 1, wherein the free radical generator comprises a channel disposed to flow the low oxygen demand liquid therethrough during irradiation with actinic radiation.

3. The method of claim 2, wherein a surface of the channel is reflective to actinic radiation.

4. The method of claim 2, wherein a wall of the channel comprises a coating capable of catalytically promoting free radical production.

5. The method of claim 4, wherein the coating comprises titanium dioxide.

6. The method of claim 2, wherein a wall of the channel comprises any of stainless steel, titanium or alloys thereof.

7. The method of claim 1, further comprising adding a hydroxyl free radical donor to the low oxygen demand liquid.

8. The method of claim 7 wherein the hydroxyl free radical donor comprises at least one of hydrogen peroxide, ozone, oxygen, and a peroxygen compound.

9. The method of claim 8, wherein the low oxygen demand liquid has at least about 0.1% active $H_2O_2$.

10. The method of claim 1, further comprising lowering a pH of the low oxygen demand liquid to less than about 9.

11. A method of reducing oxygen demand in a water system comprising:

providing a low oxygen demand liquid, not from the water system, to a hydroxyl free radical generator;

generating hydroxyl free radicals in the low oxygen demand liquid; and adding the low oxygen demand liquid comprising the hydroxyl free radicals to the water system.

12. The method of claim 11, further comprising adding a hydroxyl free radical donor to the low oxygen demand liquid.

13. The method of claim 12, wherein the hydroxyl free radical donor comprises at least one of hydrogen peroxide, ozone, oxygen, and a peroxygen compound.

14. The method of claim 13, wherein the low oxygen demand liquid has at least about 0.1% active $H_2O_2$.

15. The method of claim 11, further comprising lowering a pH of the low oxygen demand liquid to less than about 9.

16. The method of claim 11, wherein the free radical generator comprises at least one channel disposed to flow the low oxygen demand liquid therethrough, the channel comprising a metal selected from the group consisting of titanium and titanium alloy.

17. The method of claim 16, wherein a surface of the channel comprises a coating capable of catalytically promoting free radical production in the low oxygen demand liquid.

18. The method of claim 17, wherein the coating comprises titanium dioxide.

* * * * *